United States Patent [19]
Byers

[11] Patent Number: 5,842,111
[45] Date of Patent: *Nov. 24, 1998

[54] CUSTOMER PREMISE EQUIPMENT FOR USE WITH A FIBER ACCESS ARCHITECTURE IN A TELECOMMUNICATIONS NETWORK

[75] Inventor: Charles Calvin Byers, Aurora, Ill.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 701,923

[22] Filed: Aug. 23, 1996

[51] Int. Cl.$^6$ .................................................... H04N 7/173
[52] U.S. Cl. ............................ 455/6.3; 455/6.2; 348/10; 348/8
[58] Field of Search .................................. 348/10, 11, 6, 348/7, 8, 12, 13; 455/6.2, 6.3, 6.1, 5.1, 4.2, 3.2; 395/200.47; 370/474, 420, 421, 395, 465; H04N 7/16, 7/173

[56] References Cited

U.S. PATENT DOCUMENTS

| | | | |
|---|---|---|---|
| 5,387,927 | 2/1995 | Look et al. | 348/6 |
| 5,537,408 | 7/1996 | Branstad et al. | 370/79 |
| 5,543,951 | 8/1996 | Moehrmann | 395/158 |
| 5,594,726 | 1/1997 | Thompson et al. | 348/12 |
| 5,608,447 | 3/1997 | Farry et al. | 348/7 |
| 5,625,865 | 4/1997 | Moehrmann | 348/13 |

OTHER PUBLICATIONS

"OPTOBUS™", Manufacturer's Brochure, BR1459/D, Rev. 1, Motorola, printed Jun. 1996, 10 pp.

*Primary Examiner*—Chris Grant

[57] ABSTRACT

The customer premise equipment of the invention consists of an OC-1, OC-3C or OC-12C receiver and an OC-1, OC-3C or OC-12C transmitter that interface with an ATM segmentation/reassembly circuit. In the downstream direction the segmentation/reassembly circuit receives the signals from the receiver and separates the signals into ATM cells. In the upstream direction the segmentation/reassembly circuit reassembles the ATM cells from the customer premise into a broadband signal and delivers the signal to the transmitter. The segmentation/reassembly circuit interfaces with a passive bus to deliver to and receive cells from a video decoder, POTS line card and a personal computer interface such that the customer can receive voice, data and video on a fiber to the home access architecture. A video system provides an ensemble of video channels at the customer premise.

24 Claims, 5 Drawing Sheets

CUSTOMER PREMISE EQUIPMENT FOR USE WITH A FIBER ACCESS ARCHITECTURE IN A TELECOMMUNICATIONS NETWORK

CROSS REFERENCE TO RELATED APPLICATION

This application is related to the application of Charles C. Byers entitled "Improved Fiber Access Architecture For Use In Telecommunications Networks" which application is assigned to the assignee of the present application, and is being filed concurrently herewith.

BACKGROUND OF THE INVENTION

The invention relates, generally, to the distribution systems of telecommunications networks and, more particularly, to improved customer premise equipment for use with fiber technology access architecture.

It will be understood that the typical telecommunications network consists of a plurality of switching systems connected to one another for transmitting signals therebetween. Customer premise equipment (CPE) such as telephone stations, multimedia equipment, personal computers and the like are connected to selected ones of the switching systems via the outside distribution plant. The switching systems hosting the CPE are commonly referred to as central office switches. The switching systems route and transmit the signals between the CPE thereby allowing communication between different CPE in the network.

The outside distribution plant of a telecommunications network comprises those network elements that connect the central office switch to the CPE. The typical outside distribution plant includes a customer line that connects the central office switch to the customer premise and may include a remote terminal such as a digital loop carrier, a broadband distribution element or the like. The customer line has typically consisted of a twisted copper wire pair for transmitting voice to the customer premise.

While the twisted copper wire pair customer line adequately supports relatively low speed narrowband voice traffic, it is inadequate for high speed broadband traffic such as data, digital video and the like. Accordingly, high speed broadband access architectures have been developed to support these high speed applications. Existing broadband architecture includes digital subscriber loop (DSL), hybrid fiber coax (HFC) and switched digital video (SDV). While these broadband architectures provide relatively large bandwidth, they suffer from a number of shortcomings. For example, these architectures are asymmetrical such that while the bandwidth available in the central office to customer premise direction is relatively large, the bandwidth available in the customer premise to central office direction is much more limited. Moreover, the SDV architecture supports only relatively short (i.e., 900 feet) customer drops extending from the remote terminals to the customer premise. As a result, it is necessary to provide numerous, closely spaced remote terminals to provide adequate coverage in densely populated areas. Finally, the cost of the existing architectures is relatively expensive on a per line basis.

In an attempt to overcome these shortcomings, the telecommunications industry is moving towards a fiber optic access architecture to support high speed, broadband service. While the industry has recognized a need for such an access architecture, a relatively inexpensive, efficient and reliable customer premise equipment for use with fiber optic access architectures has not been developed.

Thus, a need exists in the telecommunications art for a low cost, efficient and reliable customer premise equipment for use with fiber access architecture.

SUMMARY OF THE INVENTION

The customer premise equipment of the invention consists of an OC-1, OC-3C or OC-12C receiver and an OC-1, OC-3C or OC-12C transmitter that interface with an ATM segmentation/reassembly circuit. After passing through the segmentation/reassembly circuit the data is presented to the PC bus. In the downstream direction the segmentation/reassembly circuit receives the signals from the receiver and separates the signals into ATM cells. In the upstream direction the segmentation/reassembly circuit reassembles the ATM cells from the customer premise into a broadband signal and delivers the signal to the transmitter. The segmentation/reassembly circuit interfaces with a passive bus to deliver to and receive cells from a video decoder, POTS line card and a personal computer interface such that the customer can receive voice, data and video on a fiber to the home access architecture. A video system is disclosed providing an ensemble of video channels at the customer premise.

DETAILED DESCRIPTION OF THE INVENTION

Figure 1:
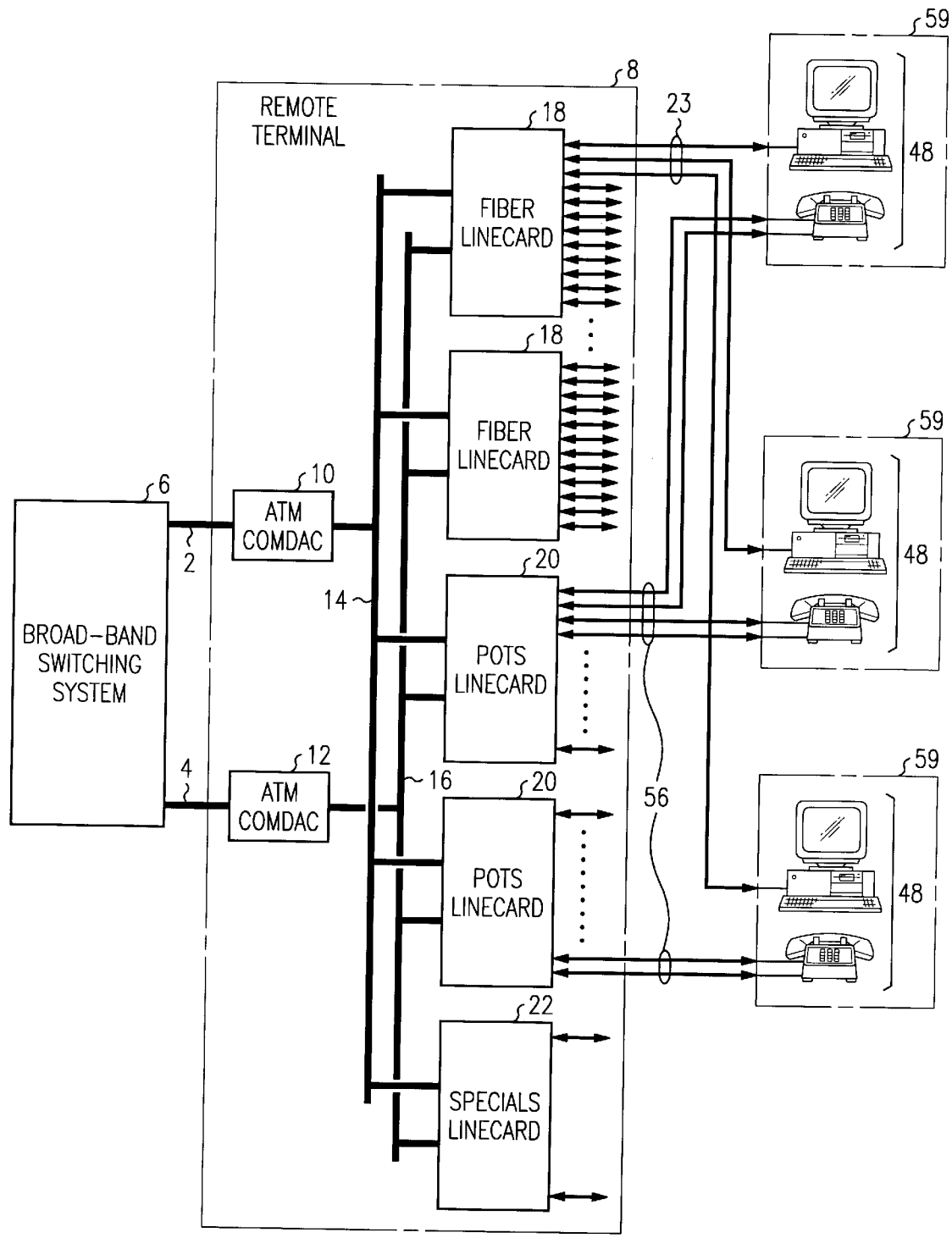
FIG. 1 is a block diagram of the fiber access architecture of the invention.

Referring more particularly to FIG. 1, the fiber access architecture of the invention consists of a first OC-12 link 2 and a second OC-12 link 4 connecting a broadband switching system 6, such as the Globeview® BSS broadband switch manufactured and sold by Lucent Technologies Inc., to remote terminal 8. The broadband switching system 6 transmits asynchronous transfer mode (ATM) signals that are defined by fixed-size cells consisting of a 48 byte payload and a 5 byte header that contains address information and error detection as is known in the art. Remote terminal 8 includes first ATM common elements 10 connected to the first link 2 and second ATM common elements 12 connected to the second link 4. The common elements function to terminate the links 2 and 4 and drive the broadband backplane 14 and 16 as is known in the art. Common elements 10 and 12 deliver the ATM signals to the first and second ATM buses 14 and 16, respectively. It is contemplated that the ATM buses 14 and 16 will operate at a data rate of 1.0 gigabits per second (Gbps) each. In the downstream direction, the ATM cells are delivered from the buses 14 and 16 to one of a plurality of line cards based on the ATM cell header address as is known in the art. The line cards include fiber line cards 18 for delivering high rate broadband traffic to the customer premise over fiber transmission media 23 as will hereinafter be described; POTS line cards 20 or ISDN or coin line cards (not shown) for delivering of narrowband voice signals to the CPE over twisted copper wire 56; and special line cards 22 for providing special services such as data port, DC alarm, and other special services. Other types of line cards can also be provided, if desired.

Figure 2:
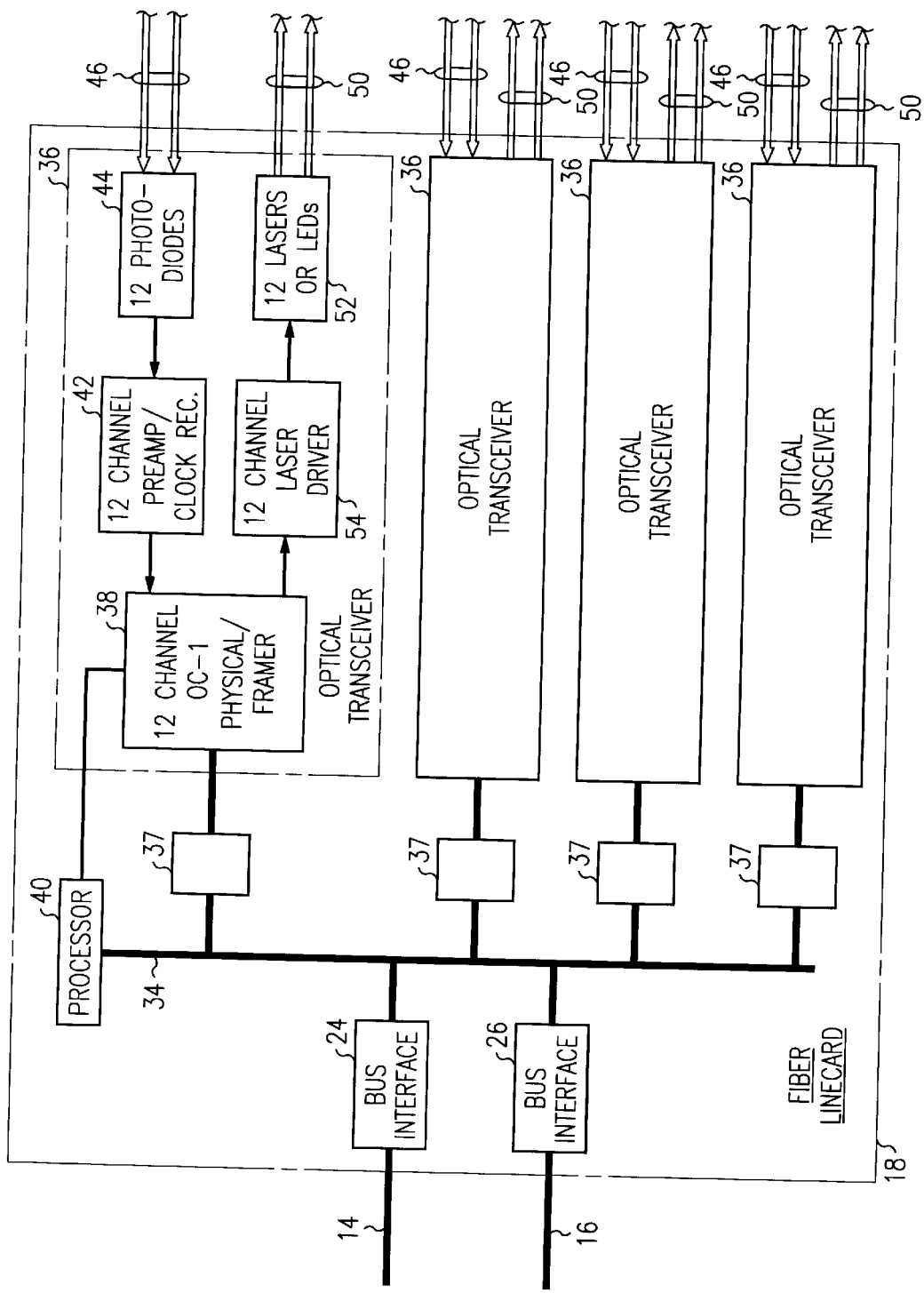
FIG. 2 is a more detailed block diagram of the fiber line card of FIG. 1.

The fiber line card 18 is shown in greater detail in FIG. 2 and consists of a first UTOPIA-2 bus interface 24 and a second UTOPIA-2 bus interface 26 connected to the ATM common elements of remote terminal 8 via broadband backplane buses 14 and 16, respectively. The UTOPIA bus interfaces 24 and 26 deliver the ATM cells to a local UTOPIA bus 34 that delivers the ATM cells to one of a plurality of ATM/SONET optical transceivers 36. Cell processing chips 37 are provided for traffic shaping, policing ATM address translation for each of the optical transceivers.

The OC-1 data streams are created under the control of processor 40 that manages the initialization and operations of all OC-1 links on the line card. Each transceiver 36 consists of a twelve channel OC-1 physical interface and framer 38 that contains a 2-cell (106 byte) FIFO buffer to store data upon its arrival from bus 34. In the downstream direction, the framer 38 splits and frames the UTOPIA-2 bus data arriving from bus 34 into twelve separate OC-1 data streams. The framer 38 also performs pointer generation and scrambling for transmission and generates idle cells when the FIFO buffer is empty. In the upstream direction, the framer 38 reverses the process and combines the 12 OC-1 signals from the customer premise into a single UTOPIA-2 signal for delivery to bus 34.

The twelve OC-1 rate signals from framer 38 are delivered to the 12 channel laser driver 54 which drive twelve lasers or LEDs 52. The lasers or LEDs drive the signals over twelve OC-1 fibers 50 to the customer premise equipment 48 at a bit rate of 51.84 Mbps. Optical transceiver 36 is capable of transmitting the signal up to five kilometers, a distance comparable to the transmission distance of voice over a twisted wire pair. It is further contemplated that the twelve channel framer 38 be replaced by a four channel framer that creates four OC-3C data streams where each data stream operates at a 155 Mbps data rate, or a single channel framer creating a single OC-12C data stream, if desired. It will be appreciated that the line card of the invention 18 can include a plurality of optical transceivers 36 as illustrated with the transceivers delivering any combination of OC-1, OC-3C and OC-12C data streams.

A second set of twelve fibers 46 extending between each of the customer premise equipment 48 and the optical transceiver 36 transmits traffic in the upstream direction from the CPE to the transceiver. Fibers 46 terminate at twelve photodiodes 44. The photodiodes 44 deliver the traffic to a twelve channel preamp and clock recovery circuit 42, as is known in the art, and delivers the twelve OC-1 data streams to the framer 38 where they are recombined into a single UTOPIA-2 data stream for delivery to bus 34. While the invention has been described using separate fibers to handle transmission of signals between the remote terminal 6 and the CPE in the upstream and downstream directions, it will be appreciated that a single bi-directional fiber can also be used with either wavelength division multiplexing or time division multiplexing combining the signals in the upstream and downstream directions.

Figure 4:
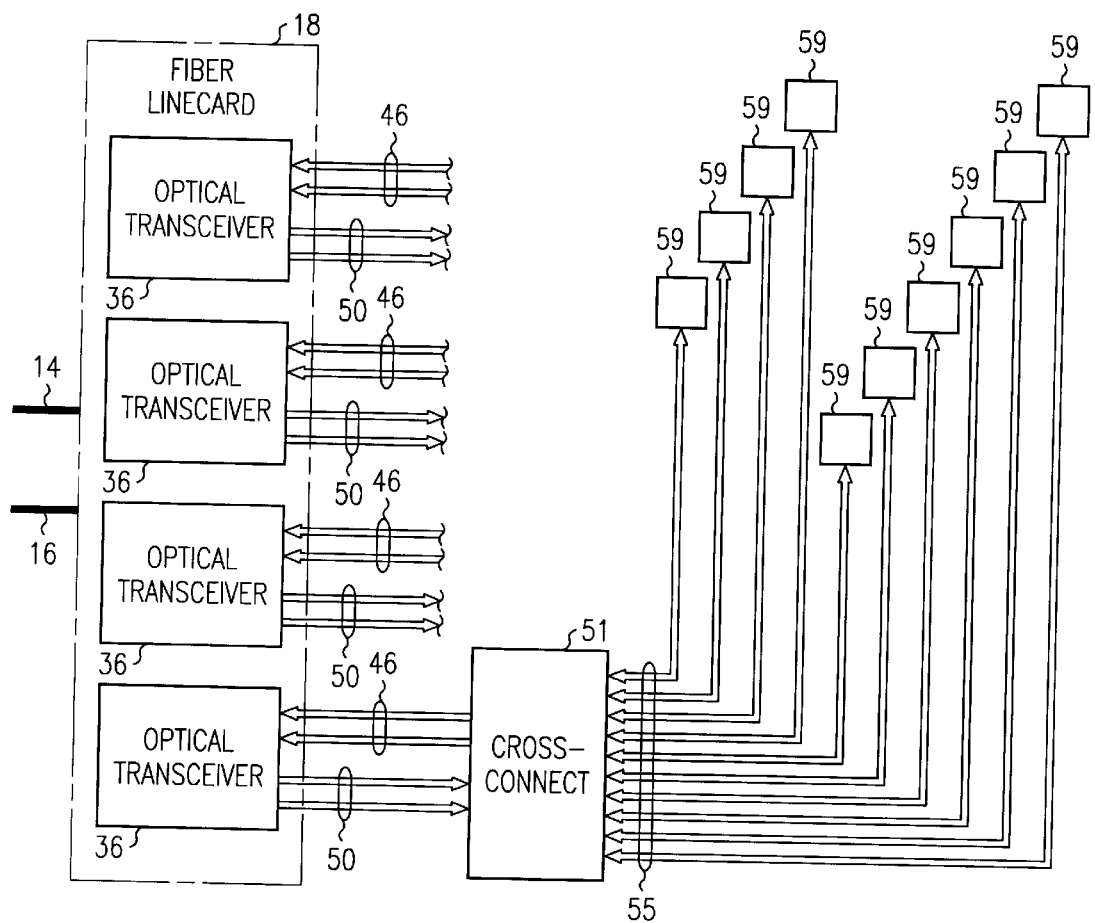
FIG. 4 is an alternate embodiment of the fiber access arrangement of FIG. 1.

Because it is expected that not all customer premises will require broadband service simultaneously the resources to the fiber line card 18 can be more efficiently utilized by using crossconnect 51 as shown in FIG. 4. Specifically, crossconnect 51 has inputs communicating with each of fibers 46 and 50 from fiber line card 18. Crossconnect 51 includes multiple times as many outputs connected to fibers 55 that extend to the customer premises 59. In the preferred embodiment the ratio of outputs to inputs is 4:1. It is to be understood that each line 55 in FIG. 4 represents both an upstream and a downstream fiber. Crossconnect 51 is capable of connecting any input to any output such that any one of the fibers 46 and 50 can be connected to any of the fibers 55. This arrangement allows the broadband service of the invention to be selectively delivered to any one of the connected customer premises without dedicating network resources, i.e. a specific fiber output from the optical transceiver, to that customer premise.

Referring again to FIG. 1, each customer premise receives one OC-1 channel over optical transmission numbers 23, consisting of fibers 46 and 50, and two twisted wire pairs 56 from the POTS line card 20. The OC-1 channel provides large bandwidth, high data rate service while the twisted wire pair provides standard telephony service. It will be appreciated, however, that the OC-1 channels can support voice telephony service and that the number of customer lines provided to each customer premise is by way of example only.

Figure 3:
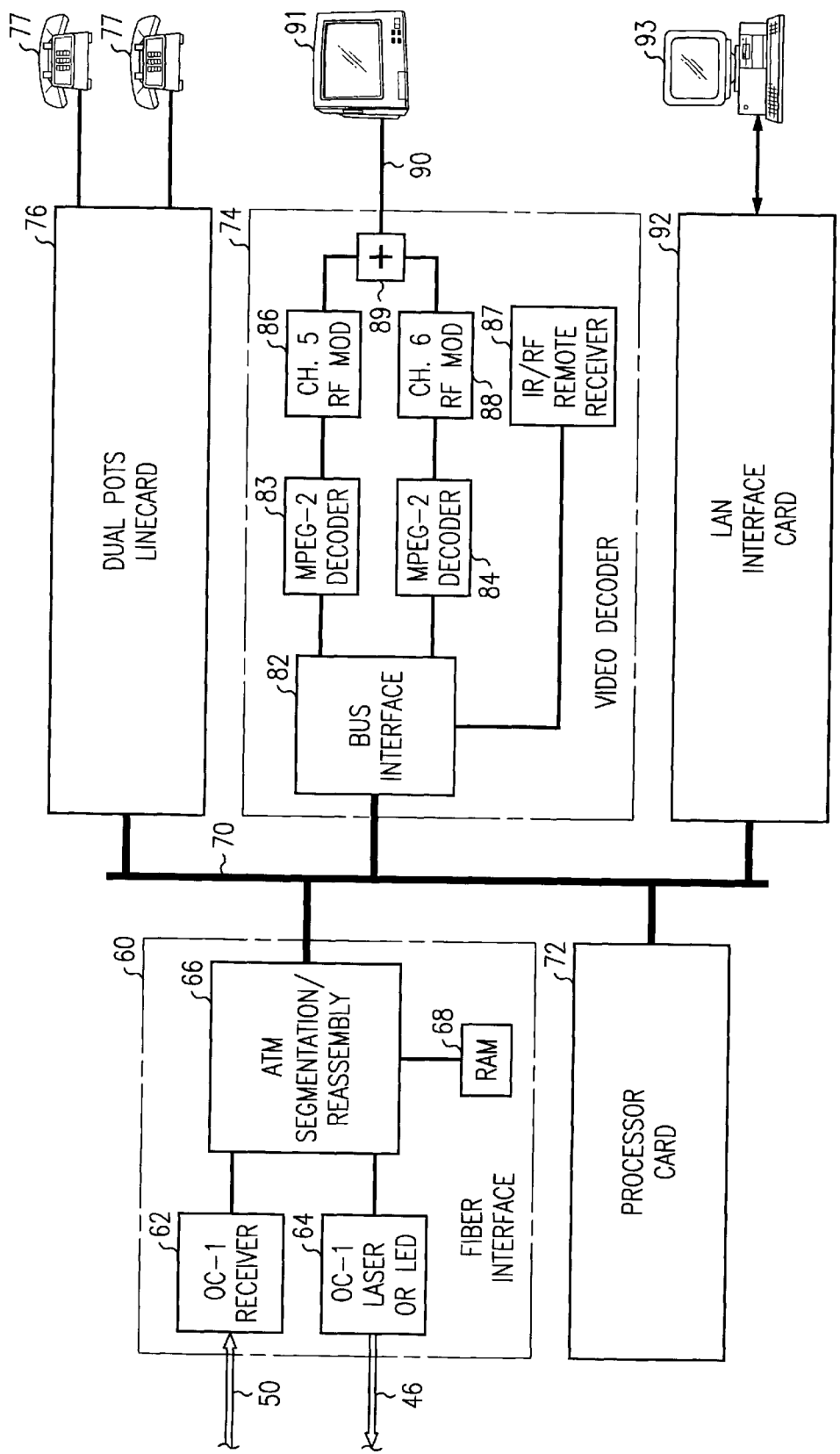
FIG. 3 is a more detailed block diagram of the customer premise equipment of FIG. 1.

Referring more particularly to FIG. 3, the customer premise equipment connected to the OC-1 channel is shown in greater detail. The customer premise equipment consists of a fiber interface 60 including an OC-1 receiver 62 for receiving downstream traffic from fiber 50. An OC-1 transmitter 64 such as a laser or LED is also provided for transmitting traffic in the upstream direction over fiber 50. Both the transmitter 64 and receiver 62 are connected to an ATM segmentation/reassembly circuit 66 such as the Motorola MC92516 ATM segmentation and reassembly controller. RAM 68 controls the operation of segmentation/reassembly circuit 66 to provide SONET framing, cell delineation, ATM adaptation layer control and standard personal computer interface (PCI). Other backplane interfaces than PCI can be used if desired. If OC-3C or OC-12C signal streams are received from the fiber line card 18, then an OC-3C or OC-12C receiver and an OC-3C or OC-12C laser driver would be used in place of receiver 62 and laser driver 64, respectively.

If the customer desires only data and has a personal computer with a free personal computer backplane interface such as a personal computer interface (PCI) slot, the fiber interface 60 can be connected directly to the personal computer for transmitting data directly thereto. If the customer desires digital video and/or telephony service over fiber or has no free PCI slot in the computer, the fiber interface 60 interfaces with a passive bus 70 such as a PCI bus. Bus 70 delivers the segmented signal either to the LAN interface card 92, a PCI MPEG-2 video decoder 74 for digital video and/or PCI dual POTS line card 76. A processor card 72 is provided to perform signal processing as is known in the art.

POTS line card 76 hosts two POTS lines connected to telephones 77 for telephony service. POTS line card 76 receives ATM cells from bus 70 and converts them to 64 kbps channels for delivery to telephones 77. It is intended that the telephony service provided by line card 76 be secondary service. Should the line card 76 support primary life line service, a battery backup power supply or power feed from the remote terminal would be used to ensure continuation of service during a power outage.

The video decoder 74 includes a bus interface 82 that delivers digital video to one of two MPEG-2 decoders 83 and 84. The MPEG- decoders function to receive ATM cells decompress those cells and create standard audio and video signals. The decoded signals are delivered to a channel 5 RF modulator 86 and a channel 6 RF modulator 88, respectively. The signal can then be delivered to the customer's television sets 91 via any suitable transmission media such as cable 90. Stereo Audio channels are decoded in parallel with the video MPEG decoding. Also, an infrared or RF remote receiver 89 is provided to allow remote control.

Figure 5:
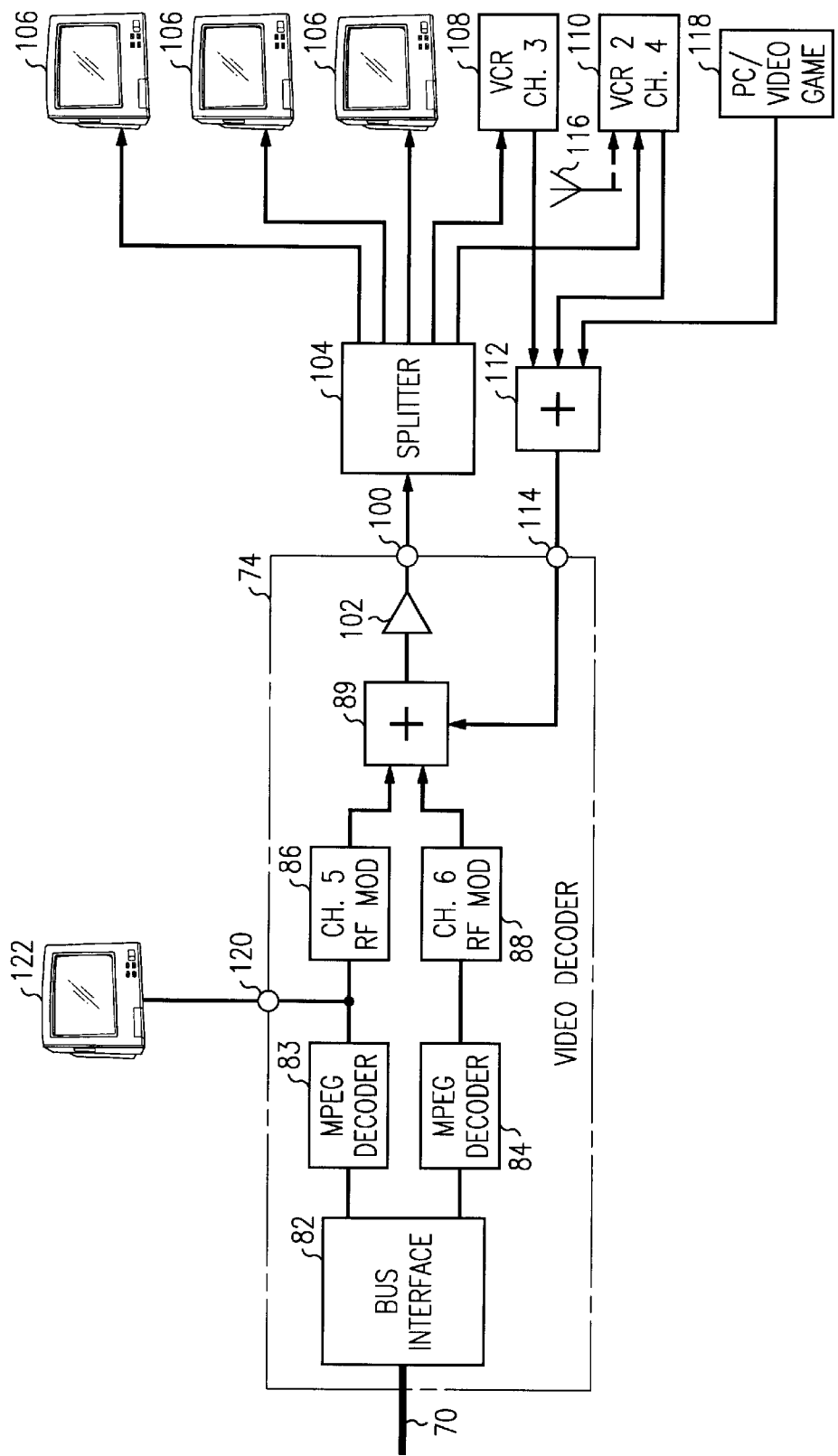
FIG. 5 is an alternate embodiment of the video system shown in FIG. 3.

An alternate embodiment of the video decoder 74 and associated video system is shown in FIG. 5 consisting of the bus interface 82, MPEG-2 decoders 83 and 84, and channel 5 RF modulator 86 and channel 6 RF modulator 88 connected to two inputs of combiner 89. Located between combiner 89 and external connector 100 is amplifier 102. External connector 100 is connected to a splitter 104 that delivers the signal to a plurality of televisions or monitors 106 and the RF inputs of a first video cassette recorder (VCR) 108 and a second VCR 110. The channel 3 output of VCR 108 and the channel 4 output of VCR 110 are connected to combiner 112 that the delivers the combined signal to external connection 114 of video decoder 74. External connection 114 is connected to the third input of combiner 89. Because the outputs of VCR 108, VCR 110, channel 5 modulator 86 and channel 6 modulator 84 all are connected to combiner 89, any of televisions 106 can be tuned to any one of the four video source (i.e. ch. 3, ch. 4, ch. 5 or ch. 6) to receive the output of VCR 108, VCR 110 or digital video on demand from either channel 5 or channel 6. Moreover, the RF input to one of VCRs 108 or 110 can be connected to an antenna 116 to provide an additional video source. The input of combiner 112 can also receive the channel 3 or channel 4 output of a personal computer or video game 118. The system of the invention provides an ensemble of video sources (channels) without the need for an RF switch in the customer premise. Finally, a connection from the video and audio outputs of the MPEG-2 decoder 83 can be extended to an external connection 120 for direct connection to television 122 to avoid the downstream system and provide higher quality audio/video to the customer.

The personal computer interface card 92 receives ATM cells off of the PCI bus 70 and converts them to standard packets using standard ATM adaptation layer processing. These packets are sent out in standard personal computer interface to a personal computer 93 in order to provide work at home and internet access services.

The fiber access architecture described above provides a symmetric 51.84 Mbps data rate over fiber optic point to point links at a distance of 5 km. Because this distance is consistent with the limits of twisted wire pair drops, the fiber access elements of the remote terminal can be provided consistently with the twisted wire pair elements such that it is not necessary to provide the numerous remote terminals as in the prior art fiber access architecture if such remote terminals are not otherwise desired. The robust nature of the architecture and its simplicity make it relatively inexpensive on a per line cost as compared to other know broadband access technologies.

It is to be understood that the above description is only of one preferred embodiment of the invention. Numerous other arrangements may be devised by one skilled in the art without departing from the scope of the invention. The invention is thus limited only as defined in the accompanying claims.

What is claimed is:

1. Customer premise equipment for receiving broadband signals from a telecommunications network, comprising:
    means for receiving the broadband signals;
    means for segmenting said broadband signals into ATM cells;
    a passive bus for receiving said ATM cells;
    said passive bus directly connected to and delivering all of said ATM cells to a line card for providing telephony service, to a video decoder and to a personal computer interface card.

2. The customer premise equipment according to claim 1 further including means for receiving the ATM cells from said passive bus and for reassembling the ATM cells into said broadband signal.

3. The customer premise equipment according to claim 2, further including a means for transmitting the reassembled broadband signal.

4. The customer premise equipment according to claim 1, wherein the means for receiving includes an OC-1 receiver.

5. The customer premise equipment according to claim 1, wherein the means for receiving includes an OC-3C receiver.

6. The customer premise equipment according to claim 1, wherein the means for receiving includes an OC-12C receiver.

7. The customer premise equipment according to claim 1, wherein the means for segmenting is controlled by a random access memory to create the desired ATM cells.

8. The customer premise equipment according to claim 1, wherein said personal computer interface card is connected to a personal computer.

9. Customer premise equipment for receiving broadband signals from a telecommunications network, comprising:
    means for receiving the broadband signals;
    means for segmenting said broadband signals into ATM cells;
    a passive bus for receiving said ATM cells;
    said passive bus delivering said ATM cells to a line card for providing telephony service, a video decoder and a personal computer interface card;
    wherein the video decoder includes a first decoder and second decoder for creating standard audio and video signals and a first modulator and a second modulator moderating said video signals on a first channel and a second channel.

10. The customer premise equipment of claim 8, further including means for combining the first and second channels into a combined signal.

11. The customer premise equipment of claim 10, wherein said combined signal is delivered to at least one television and at least one VCR.

12. The customer premise equipment of claim 11, wherein said at least one VCR outputs signals on a third channel, said signals on said third channel being delivered to said means for combining.

13. Customer premise equipment, comprising:
    means for receiving broadband signals;
    means for creating standard audio visual signals on a first channel and a second channel;
    means for combining the signals of the first and second channels to create a combined signal;
    means for amplifying the combined signal;
    means for splitting the signal and for delivering the signal to at least one television and to a first video cassette recorder (VCR) and a second VCR, said first VCR outputting a signal on a third channel and said second VCR outputting a signal on a fourth channel;
    means for delivering the signals on the third and fourth channels to said means for combining whereby an ensemble of channels is provided to the at least one television.

14. The customer premise equipment of claim 13, wherein the input to the first VCR is from an antenna.

15. A method for receiving broadband signals from a telecommunications network at a customer premise, comprising:

receiving the broadband signals;

segmenting said broadband signals into ATM cells;

delivering all of said ATM cells over a passive bus directly connected to a line card for providing telephony service, to a video decoder and to a personal computer interface card.

16. The method according to claim 15 further including the step of receiving the ATM cells from said passive bus and reassembling the ATM cells into said broadband signal.

17. The method according to claim 16, further including the step of transmitting the reassembled broadband signal.

18. The method according to claim 15, including the step of transmitting the reassembled broadband signal.

19. A method for receiving broadband signals from a telecommunications network at a customer premise, comprising:

receiving the broadband signals;

segmenting said broadband signals into ATM cells;

delivering said ATM cells over a passive bus to a line card for providing telephony service a video decoder and a personal computer interface card;

creating standard audio and video signals on a first channel and a second channel; and combining the first and second channels into a combined signal.

20. The method of claim 19, further including the step of delivering said combined signal to at least one television and at least one VCR.

21. The method of claim 20, wherein said at least one VCR outputs signals on a third channel, delivering said signals on said third channel to said means for combining.

22. A method of delivering signals at a customer premise comprising the steps of:

receiving signals;

creating standard audio visual signals on a first channel and a second channel;

combining the signals of the first and second channels to create a combined signal;

amplifying the combined signal;

splitting the signal and delivering the signal to at least one television and to a first video cassette recorder (VCR) and a second VCR, outputting a signal on a third channel from said first VCR and outputting a signal on a fourth channel from said second VCR; and combining the signals on the third and fourth channels with said combined signal whereby an ensemble of channels is provided to the at least one television.

23. Customer premise equipment for receiving broad band signals from metallic communications network, comprising:

means for receiving the broad band signals;

means for segmenting said broad band signals into ATM cells;

a passive bus for receiving all of said ATM cells;

said passive bus directly connected to and delivering all of said ATM cells to a line card for providing telephony service, and to a video decoder.

24. A method for receiving broad band signals from a telecommunications network at a customer premise, comprising:

receiving the broad band signals;

segmenting said broad band signals into ATM cells;

delivering all of said ATM cells over a passive bus directly connected to a line card for providing telephone service and directly connected to a video decoder.

* * * * *